United States Patent
Simpson et al.

[19]

[11] Patent Number: 5,971,842
[45] Date of Patent: Oct. 26, 1999

[54] MEAT EMULSION PUMP CONTROL SYSTEM FOR MEAT ENCASING MACHINE, AND METHOD OF USE THEREOF

[75] Inventors: Michael S. Simpson; David Hamblin, both of Norwalk; Steven P. Hergott, West Des Moines; Brent M. Veldkamp, Des Moines, all of Iowa

[73] Assignee: Townsend Engineering Company, Des Moines, Iowa

[21] Appl. No.: 09/004,361

[22] Filed: Jan. 8, 1998

Related U.S. Application Data

[63] Continuation-in-part of application No. 08/959,583, Oct. 29, 1997
[60] Provisional application No. 60/047,487, May 23, 1997.
[51] Int. Cl.⁶ ................................................. A22C 11/02
[52] U.S. Cl. .............................. 452/51; 452/31; 452/46
[58] Field of Search ................... 452/31, 35, 30, 452/46, 51

[56] References Cited

U.S. PATENT DOCUMENTS

| | | |
|---|---|---|
| 4,218,003 | 8/1980 | Plewa et al. . |
| 4,370,779 | 2/1983 | Meier ........................................ 452/35 |
| 4,451,954 | 6/1984 | Müller et al. ............................. 452/35 |
| 4,602,402 | 7/1986 | Schnell ..................................... 452/31 |
| 5,092,813 | 3/1992 | Kasai et al. ............................... 452/46 |
| 5,147,239 | 9/1992 | Staudenrausch ......................... 452/30 |
| 5,197,915 | 3/1993 | Nakamura et al. . |

*Primary Examiner*—Willis Little
*Attorney, Agent, or Firm*—Zarley, McKee, Thomte, Voorhees & Sease

[57] ABSTRACT

A meat encasing machine has a looper horn, linking chain and conveyor which, prior to production, have home positions which are determined. A pulsed signal is generated as the looper horn rotates and is transmitted to an amplifier from an encoder on the servo motor for the looper horn and the conveyor. The output pulse signal is then reduced in frequency so that it can be read by a PLC. The PLC counts the pulses in the signal and can determine the relative position of the looper horn based on the count and can therefore minimize the rotation of the looper horn in the home position at the beginning of each new cycle. The meat encasing machine may also be controlled such that the linking chain, looper, and conveyor have no direct mechanical or electrical interaction between each other. By driving the components with separate servo motors, each can be precisely controlled in the desired ratios with respect to each other.

4 Claims, 6 Drawing Sheets

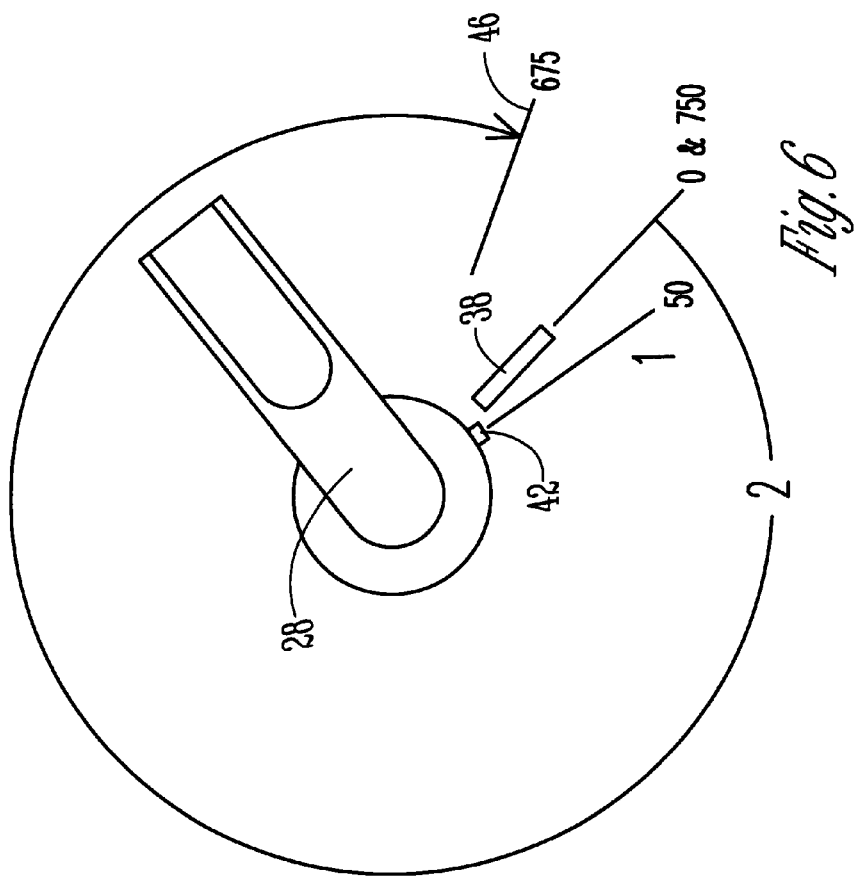
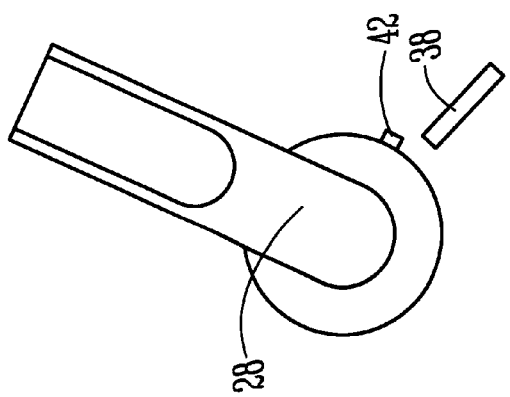

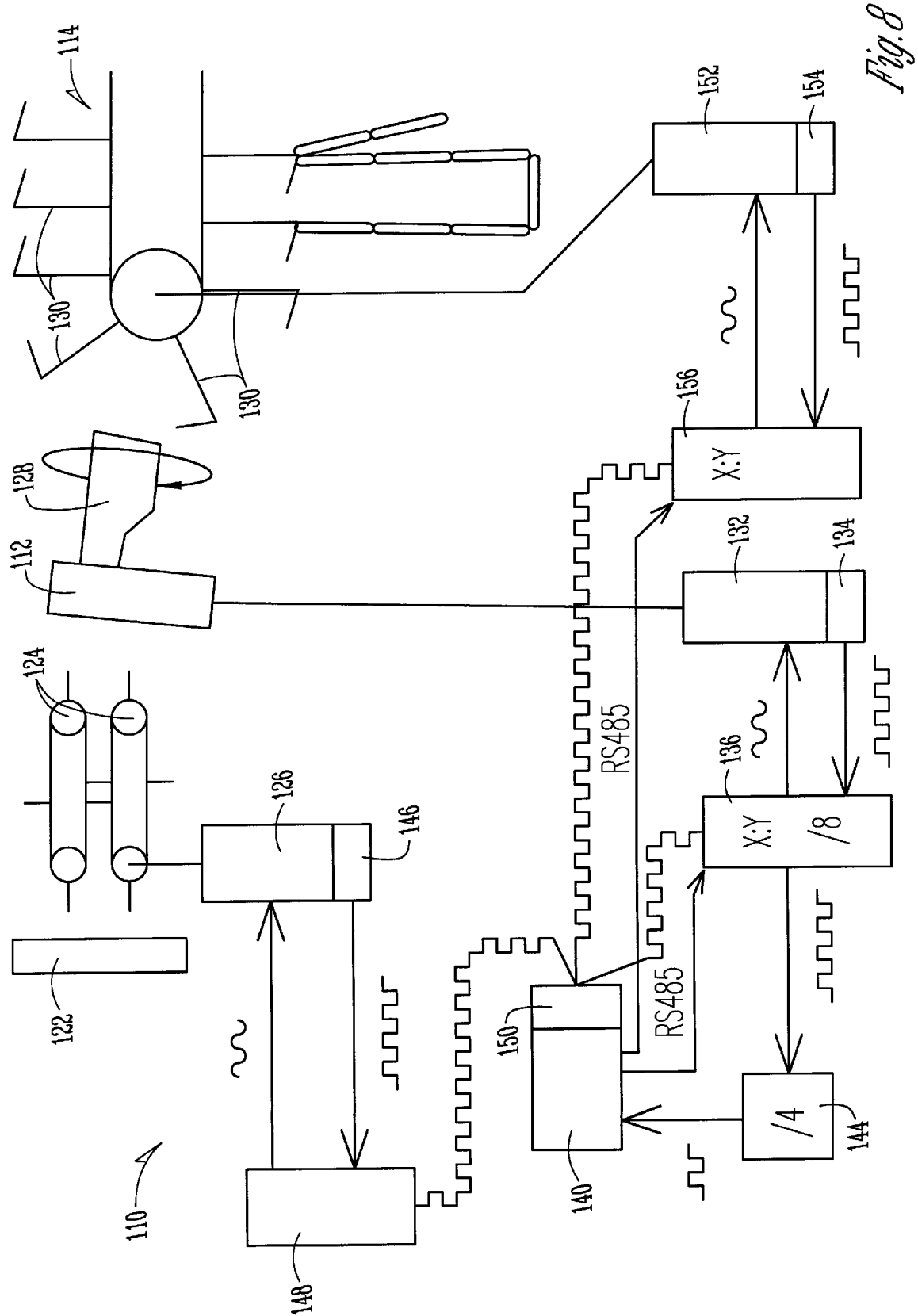

MEAT EMULSION PUMP CONTROL SYSTEM FOR MEAT ENCASING MACHINE, AND METHOD OF USE THEREOF

This application is a continuation in part of Applicants' patent application Ser. No. 08/959,583 filed Oct. 29, 1997 and Applicants' Provisional Application Ser. No. 60/047,487 filed May 23, 1997.

BACKGROUND OF THE INVENTION

Meat encasing machines have a linker which uses a meat emulsion pump connected to a stuffing tube upon which a shirred casing is mounted. Meat emulsion is extruded from the stuffing tube into the casing and the filled casing is rotated by means of a chuck and delivered to a linker for creating a linked strand of sausages. The linked strand then passes through a rotating looping horn and loops of sausages from the strand are deposited on hooks of a conveyor located downstream from the horn. These conventional machines mechanically connect the operation of the horn and the conveyor to coordinate their respective functions. Special attention then must be given to coordinate the action of the pump with respect to the horn and the conveyor.

A cycle of the foregoing machine is completed as each "stick" of shirred casing is filled, and the pump is disengaged. The "stopped" portion of the horn needs to be assessed before a new cycle with a new shirred casing stick is implemented. While the down time between cycles is brief, in the order of 2 to 4 seconds or more of an 18 second cycle, this down time contributes to the inefficiency of the overall operation.

It is therefore a proposed object of this invention to reduce the down time between cycles in the operation of a sausage encasing machine.

It is a further object of the invention to simplify the operation of the pump clutch from cycle to cycle so as to reduce the down time between cycles.

SUMMARY OF THE INVENTION

The home position of the looper horn, linking chain and conveyor prior to production of a meat encasing machine are determined. A pulsed signal is generated as the looper horn rotates and is transmitted to an amplifier from an encoder on the servo motor for the looper horn and the conveyor. The output pulse signal is then reduced in frequency so that it can be read by a PLC. The PLC counts the pulses in the signal and can determine the relative position of the looper horn based on the count and can therefore minimize the rotation of the looper horn in the home position at the beginning of each new cycle.

In an alternate embodiment, no direct mechanical or electrical interaction between the linking chain axis and the conveyor motor axis exists. In the alternate embodiment a plurality of servo-motors precisely control the operation of the linking chains, the looper, and the conveyor.

BRIEF DESCRIPTION OF THE DRAWINGS

FIG. 5 is a schematic front elevational drawing of the looper horn of FIG. 4;

FIG. 6 is a schematic front elevational drawing of the looper horn shown in FIG. 4 showing variable positions thereof;

FIG. 8 is a schematic drawing of the components of a meat encasing machine of another alternative embodiment of this invention.

DETAILED DESCRIPTION OF THE PREFERRED EMBODIMENT

The present invention will be described as it applies to its preferred embodiment. It is not intended that the present invention be limited to the described embodiment. It is intended that the invention cover all alternatives, modifications, and equivalencies which may be included within the spirit and scope of the invention.

Figure 1:
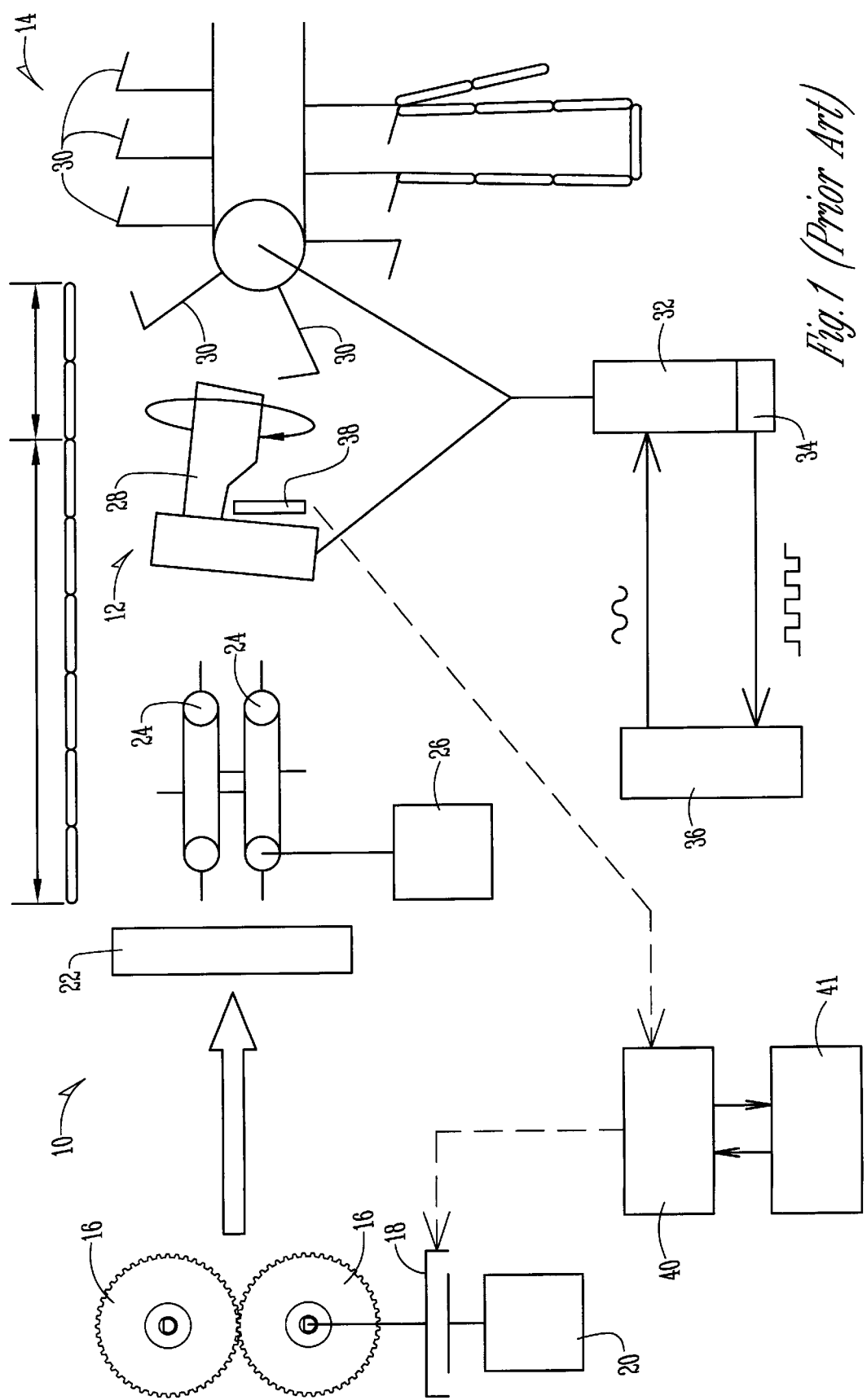
FIG. 1 is a schematic drawing of the components of a meat encasing machine of the prior art.
Figure 3:
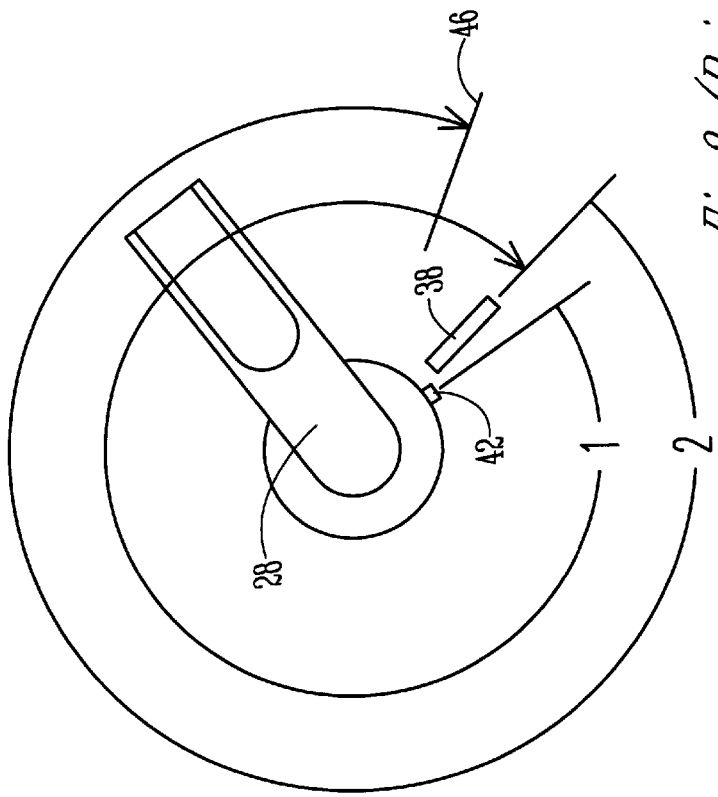
FIG. 3 is a schematic front elevational drawing of the looper horn of FIG. 1 showing variable positions thereof.
Figure 2:
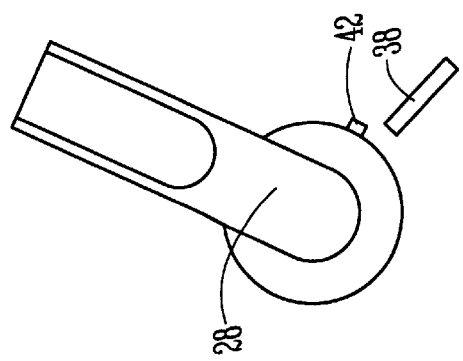
FIG. 2 is a schematic front elevational drawing of the looper horn of FIG. 1.

While FIGS. 1–3 have been characterized as prior art, they actually only preceded in time the invention of FIGS. 4–8, and are not deemed to be prior art in a 35 U.S.C. §102 or 103 sense.

FIGS. 1–3 show a prior art machine of which the instant invention is an improvement. FIG. 1 is a diagram showing a linking machine 10, a looper 12, and a conveyor 14. As shown, the linker 10 includes a pair of pump metering gears 16 which are engaged or disengaged by a pump clutch 18. The pump motor 20 is used to drive the pump metering gears 16. The linker 10 also includes a twister 22 positioned upstream from the linking chains 24. The linking chains 24 are driven by a linker motor 26. As the links of meat product are linked by the linker 10, they are fed through a looper horn 28 which rotates in order to hang a predetermined number of links between a number of hooks 30 which are formed on the conveyor 14. As the horn 28 rotates, the conveyor moves so that the hooks 30 pick up a loop comprised of a predetermined number of links.

FIG. 1 also shows the system that controls the linker 10, the looper 12, and the conveyor 14. The looper 12 and conveyor 14 are both precisely controlled by a servo motor 32. Operatively coupled to the servo motor 32 is a servo encoder 34 which creates a quadrature feedback pulsed signal to the servo amplifier 36 which controls the operation of the servo motor 32.

The looper 12 includes a proximity sensor 38 which is operatively connected to a programmable logic controller (PLC) 40. The PLC 40 is also operatively connected to the pump clutch 18.

It is very important that the linking chains 24, looper 12, and conveyor 14 are precisely synchronized prior to production cycles. In order to set the correct positioning relationship between the linker chains 24 and the conveyor 14, a simple homing routine is performed. The linking chains 24 first jog at a predetermined slow constant velocity, while a photoelectric fixed field sensor waits to sense a butterfly (not shown) mounted on the linking chains 24. The butterfly elements are conventional (see U.S. Pat. No. 3,191,222, FIGS. 9 and 18). When a butterfly is sensed and passes by the sensor, a timer is started and eventually times out. When the timer times out, the linking chains are stopped with the intent of stopping a butterfly close to the twister chuck (not shown). The conveyor 14 also starts a homing routine after the linking chains 24 are finished homing.

FIGS. 2 and 3 are diagrams of the looper 12. As shown, the looper horn 28 includes a stainless steel screw 42 which rotates along with the looper horn 28. At the beginning of the homing routine, the conveyor 14 jogs at a predetermined slow constant velocity while the sensor 38 waits to sense the passing of the stainless steel screw 42. When the screw 42 passes, a timer 41 (FIG. 1) is started and eventually times out. When the timer 41 times out, the conveyor 14 and looper horn 28 are stopped. One example of this routine is illustrated in FIG. 3. At the beginning of a cycle, the looper horn 28 must rotate around until the screw 42 encounters the proximity switch 38. This rotation is designated in FIG. 3 as the line "1". The looper horn 28 must then rotate to the virtual home position 46 which is designated in FIG. 3 as the line "2". In the example shown in FIG. 3, the looper horn 28 must rotate almost two entire turns before reaching the virtual home position 46.

Figure 4:
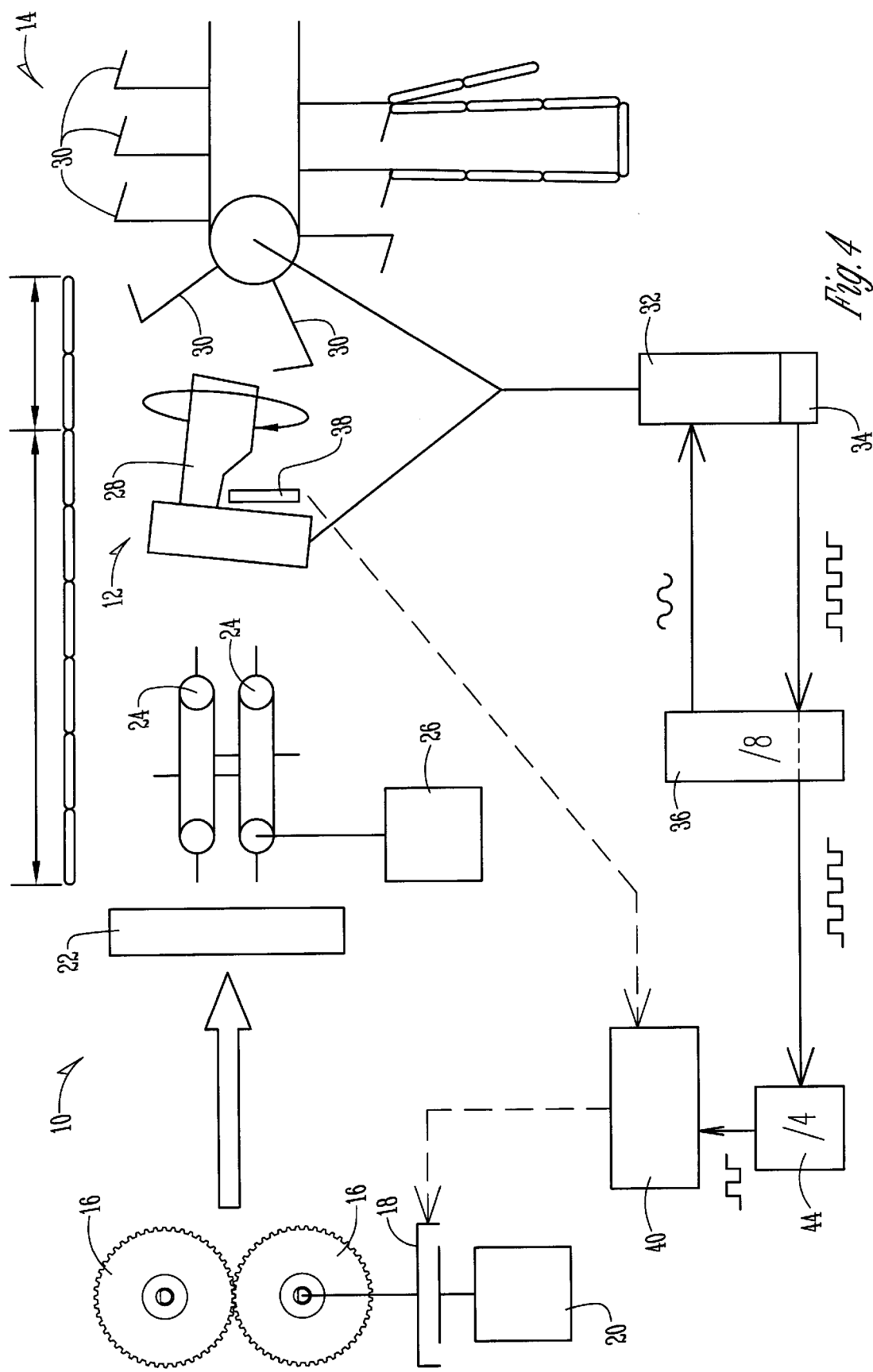
FIG. 4 is a schematic drawing of the components of a meat encasing machine of this invention.

FIGS. 4–6 show an improved control system of the present invention. FIG. 4 is a diagram of the linker 10, looper 12, and conveyor 14 which are substantially the same as that shown in FIG. 1. However, the system shown in FIG. 4 homes and synchronizes the conveyor and looper in an improved manner. Like the system shown in FIG. 1, the looper 12 and conveyor 14 are driven by a servo motor 32 which includes a servo encoder 34 and a servo amplifier 36. Again, a quadrature pulsed signal created by the servo encoder 34 is fed back to the servo amplifier 36.

With the present invention, this pulsed signal is used by the PLC 40 to anticipate the looper horn 28. The feedback quadrature pulsed signal from the servo encoder 34 is preferably reduced in frequency to a level more usable by the PLC 40. To accomplish this, the servo amplifier divides the pulsed signal by eight and sends the signal to a divider 44 which divides the signal by four resulting in a pulsed signal having a frequency $\frac{1}{32}$ of the frequency of the feedback signal from the servo encoder 34. This divided pulsed signal is then provided to the PLC 40 and used as follows.

FIGS. 5 and 6 are diagrams of the looper horn 28 which is structurally similar to that shown in FIG. 2. As shown in FIG. 4, a stainless steel screw 42 is coupled to the looper horn 28 and is rotatable with the looper horn 28. Also shown is a stationary proximity switch 38 which defines a reference point. The proximity switch 38 is operatively connected to the PLC 40. When the stainless steel screw 42 passes the proximity switch 38, a counter is reset to 0. As the looper horn 28 rotates, the pulses from the divider 44 are counted by the PLC 40. In the preferred embodiment, one full rotation of the looper horn 28 results in 750 pulses being counted. Since the number of pulses per rotation is constant, by counting the number of pulses, the PLC 40 will always know the relative position of the looper horn 28. At the beginning of each cycle, the looper horn 28 can then be positioned to the virtual home position 46 without first rotating past the proximity sensor 38 like the prior art system shown in FIGS. 1–3.

In the example shown in FIG. 6, the proximity switch 38 is shown at the relative location of 0 and 750 pulses. If the looper horn 28 is stopped at the end of a cycle at the position designated as "1", the PLC 40 would have counted 50 pulses since the counter was zeroized when the screw 42 passed the proximity sensor 38. At the beginning of the next cycle, the PLC can bring the looper horn 28 to the virtual home position 46 by rotating the looper horn until 625 more pulses are counted (in this example, the equivalent of 675 total pulses since the counter was zeroized). Note that the virtual home position 46 is relative and therefore may be located at any other position. In the worst case scenario, the looper horn 28 would need to rotate slightly less than one full rotation before reaching the virtual home position 46.

In an alternative embodiment, the looper 12 is controlled such that upon reaching the end of a cycle, the looper horn 28 continues to rotate until it reaches the virtual home position or a predetermined position. In this way, at the beginning of the next cycle, the looper horn 28 will not have to be homed since it is already located at the virtual home position.

Figure 7:
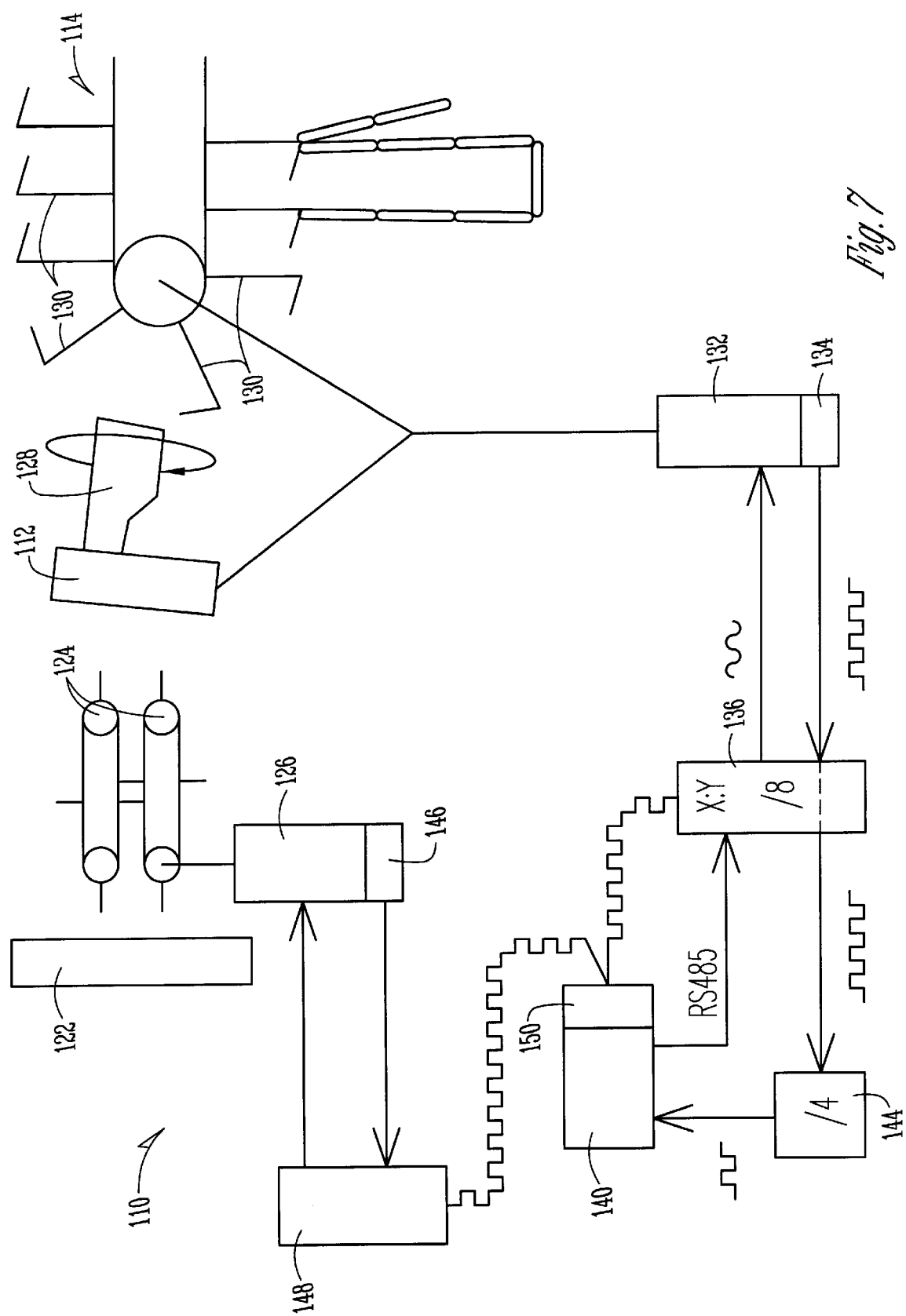
FIG. 7 is a schematic drawing of the components of a meat encasing machine of an alternative embodiment of this invention.

FIG. 7 shows an alternate embodiment of the present invention. FIG. 7 is a diagram showing a linker 110, looper 112, and conveyor 114, which share some common components with the linker 10, looper 12, and conveyor 14, shown in FIGS. 1 and 4. However, the system shown in FIG. 7 controls the linking chains 124, looper 112, and conveyor 114 in a different manner.

In the embodiment shown in FIG. 7, there is no direct mechanical or electrical interaction between the axis of the linking chains 24 and the conveyor 14. As shown, the looper horn 128 and conveyor 114 are both controlled by the servo motor 132. Operatively coupled to the servo motor 132 is a servo encoder 134 which creates a quadrature feedback pulsed signal to the servo amplifier 136 which controls the operation of the servo motor 132.

The linking chains 124 are driven by a linker servo motor 126. As described above, as the links of meat product are linked by the linker 110, they are fed through the looper horn 128 which rotates in order to hang a predetermined number of links between a number of hooks 130 which are formed on the conveyor 114. As the horn 128 rotates, the conveyor moves so that the hooks 130 pick up a loop comprised of a predetermined number of links. Operatively coupled to the servo motor 126 is a servo encoder 146 which creates a quadrature feedback pulsed signal to a servo amplifier 148 which controls the operation of the servo motor 126. In this way, the linking chains 124 can be precisely controlled by the servo motor 126.

Similar to that described above, the feedback quadrature pulsed signal from the servo encoder 134 is preferably reduced in frequency to a level more usable by the PLC 140. To accomplish this, the servo amplifier 136 divides the pulsed signal by eight and sends the signal to a divider 144 which divides the signal by four resulting in a pulsed signal having a frequency of $\frac{1}{32}$ of the frequency of the feedback signal from the servo encoder 134. This divided pulsed signal is then provided to the PLC 140 and used by the PLC as described below.

As stated above, there is no direct mechanical or electrical interaction between the axis of the linking chains 124 and the axis of the conveyor motor. The ratios between the axes of the linking chain and conveyor motor can be calculated using information stored in the PLC 140. In the control system shown in FIG. 7, the PLC 140 will "tell" (via an RS485 communication line) the axis of the linking chains 124 to follow the pulse stream that it is sent at a one-to-one ratio. As shown, the servo amplifier 148 controls the servo motor 126 based on the frequency and number of pulses received from the PLC 140. In this example, for every pulse sent by the PLC 140 to the servo amplifier 148, the servo motor 126 will rotate $\frac{1}{2000}$ of a revolution. The faster the pulses are sent to the servo amplifier 148 the faster the servo motor 126 will rotate. The pulse stream is generated by a module 150 connected to the PLC 140. The module 150 of the preferred embodiment is capable of generating a pulse stream of up to 100 kHz. Of course, other devices, with other capabilities could be used.

Similarly, the PLC 140 will "tell" (via the RS485 communication line) the axis of the conveyor 114 to follow the pulse stream sent by the PLC 140 at a ratio calculated to give the looper 112 one revolution for a certain set of circumstances. The ratio is calculated to give the looper 112 one revolution for every product of pitches per sausage times sausages per loop as entered by the operator. In this example, for every pulse sent, the servo amplifier 136 will first multiply by the ratio and the resulting pulses will drive the servo motor 132 1/2000 of a resolution for each ratio-ed pulse. The faster the pulses are sent the faster the motor 132 will rotate.

When the appropriate pulses have been sent to the servo amplifiers 148 and 136, each motor 126 and 132 will have accelerated, maintained velocity, decelerated, and stopped at an exact ratio of each other without any communication or linkage between the two motors 126 and 132.

FIG. 8 shows another alternate embodiment of the present invention. FIG. 8 is a diagram similar to FIG. 7 showing a linker 110, looper 112, and conveyor 114. However, in the embodiment shown in FIG. 8, there is no direct mechanical or electrical interaction between the linking chain axis, the conveyor chain motor axis, or the looper horn motor axis. The embodiment shown in FIG. 8 is much like the two motor embodiment shown in FIG. 7 except that a third servo motor 152 is used to drive the conveyor chain, while the servo motors 126 and 132 still control the linking chains 124 and the looper 112, respectively. This is in contrast to the embodiment shown in FIG. 7 where the servo motor 132 controls both the looper 112 and the conveyor 114.

The servo motor 152 is operatively coupled to a servo encoder 154 which creates a quadrature feedback pulsed signal for the servo amplifier 156 which in turn controls the operation of the servo motor 152. The ratios between these three axes can be calculated using the information stored on the PLC 140 and information learned from the homing routine. For this embodiment, the hook spacing of the conveyor chain must be measured and homed similar to the looper described above.

With the embodiment of FIG. 8, the system has increased flexibility. For example, the speed of the chain can be increased so that one or more hooks 130 are left empty between hanging the strand on the hooks 130. In addition, conveyor chains having different spacing can be quickly swapped. With this chain swap, the distance between the hooks 130 would be measured and also homed separately from the linker and the looper 128.

In the control system shown in FIG. 8, the PLC 140 will "tell" (via the RS485 communication line) the axis of the linking chains 124 to follow the pulse stream set at a one to one ratio. Similarly, the PLC 140 will "tell" (via the RS485 communication line), the axis of the looper 128 to follow the pulse stream sent at a ratio calculated to give one looper revolution for every product of pitches per sausage times sausage per loop as entered by the operator. Therefore, for every pulse sent, the servo amplifier 136 will first multiply by the ratio and the resultant pulses will drive the servo motor 132 1/2000 of a revolution for each ratio-ed pulse. The faster the pulses are sent, the faster the motor 132 will rotate. The PLC 140 will also "tell" (via the RS485 communication line) the conveyor chain axis to follow the pulse stream sent at a ratio calculated to give one or more hooks 130 for every looper revolution. Therefore, for every pulse sent, the servo amplifier 156 will first multiply by the ratio and the resultant pulses will drive the servo motor 152 1/2000 of a revolution for each ratio-ed pulse. The faster the pulses are sent, the faster the motor 152 will rotate.

When all of the pulses have been sent, each motor 126, 132, and 152 will have accelerated, maintained velocity, decelerated, and stopped at an exact ratio of each other without any communicating between the motors.

The motors illustrated in FIGS. 7 and 8 are shown as servo motors which is the preferred type of motor. However, other types of precision motors could also be used. Preferably, motors are used which can be given pulses at varying frequencies to provide a very precise fraction of rotations for each pulse. Types of precision motors which could be used include, but is not limited to, servo motors, stepper motors, or flux vector motors. Each of these types of motors preferably includes an amplifier which controls the voltages and currents provided to each motor and interfaces to the outside world via the pulse stream.

The preferred embodiment of the present invention has been set forth in the drawings and specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A meat encasing machine having a meat emulsion pump, a linking assembly including a rotatable looper horn, and a conveyor with a plurality of hooks thereon positioned downstream from said looper horn, the invention comprising:
    a first motor having a feedback control device operatively coupled to said linking assembly to control the linking assembly;
    a second motor having a feedback control device operatively coupled to the rotatable looper horn to control the looper horn;
    a third motor having a feedback control device operatively coupled to the conveyor to control the conveyor; and
    a controller operatively coupled to the first, second, and third motors for controlling and synchronizing the linking assembly, the looper horn, and the conveyor.

2. The meat encasing machine of claim 1 wherein the controller further comprises a programmable logic controller.

3. The meat encasing machine of claim 1 further comprising a communication link between the controller and the second and third motors, wherein the controller provides a ratio to the second and third motors via the communication line such that the second and third motors are controlled to operate at a ratio relative to the first motor.

4. A method of synchronizing the operation of the components of a meat encasing machine having a linking assembly, a looper horn, and a conveyor, the method comprising the steps of:
    operatively connecting a first motor having a feedback device to the linking assembly;
    operatively connecting a second motor having a feedback device to the looper horn;
    operatively connecting a third motor having a feedback device to the conveyor; and
    controlling the operation of the first, second, and third motors to control and synchronize the operation of the linking assembly, looper horn, and conveyor.

* * * * *